(12) United States Patent
Bharitkar

(10) Patent No.: US 12,462,102 B2
(45) Date of Patent: Nov. 4, 2025

(54) DEEP LEARNING FOR MULTIMEDIA CLASSIFICATION

(71) Applicant: Samsung Electronics Co., Ltd., Suwon-si (KR)

(72) Inventor: Sunil Bharitkar, Stevenson Ranch, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 219 days.

(21) Appl. No.: 18/480,166

(22) Filed: Oct. 3, 2023

(65) Prior Publication Data

US 2024/0126990 A1   Apr. 18, 2024

Related U.S. Application Data

(60) Provisional application No. 63/412,844, filed on Oct. 3, 2022.

(51) Int. Cl.
| | |
|---|---|
| *G06F 40/279* | (2020.01) |
| *G06F 18/24* | (2023.01) |
| *G06F 40/284* | (2020.01) |
| *G06N 3/0442* | (2023.01) |
| *G06N 3/0985* | (2023.01) |

(52) U.S. Cl.
CPC ......... *G06F 40/284* (2020.01); *G06N 3/0442* (2023.01)

(58) Field of Classification Search
CPC .......... G06F 16/45; G06F 16/55; G06F 16/65; G06F 16/75; G06F 18/24; G06F 40/279; G06F 40/30; G06N 3/08; G06N 3/098; G06N 3/0985

USPC ............................ 704/1, 9; 706/12; 707/739
See application file for complete search history.

(56) References Cited

U.S. PATENT DOCUMENTS

| | | | |
|---|---|---|---|
| 7,124,149 B2 | 10/2006 | Smith et al. | |
| 8,842,965 B1* | 9/2014 | Song ................... | G06F 16/285 |
| | | | 386/230 |
| 9,215,542 B2 | 12/2015 | Silzle et al. | |

(Continued)

FOREIGN PATENT DOCUMENTS

| | | |
|---|---|---|
| CN | 113096687 A | 7/2021 |
| CN | 116010603 A | 4/2023 |

OTHER PUBLICATIONS

Bharitkar, S., "Media classification with Bayesian Optimization and Vapnik-Chervonenkis (VC) Bounds," Proc. 45th IEEE Conf. Acoust. Speech Sig. Proc. (IEEE-ICASSP), May 4, 2020, pp. 3847-3851, Spain.

(Continued)

*Primary Examiner* — Martin Lerner
(74) *Attorney, Agent, or Firm* — Sherman IP LLP; Kenneth L. Sherman; Steven Laut

(57) ABSTRACT

One embodiment provides a computer-implemented method that includes utilizing text information obtained from a title of a media content item and a trainable model for improving accuracy for classification of the media content item. The trainable model is utilized using a sequence of text to numeric-vector embeddings for classification of the media content item. At least one of a word embedding model parameter or a latent semantic analysis dimension is jointly optimized using the text information, and a classifier model for maximizing accuracy of the classification of the media content item.

20 Claims, 6 Drawing Sheets

(56) References Cited

U.S. PATENT DOCUMENTS

| | | |
|---|---|---|
| 11,645,363 B2 | 5/2023 | Jahjah et al. |
| 2007/0208990 A1* | 9/2007 | Kim ..................... G06F 16/68 |
| | | 715/203 |
| 2007/0226207 A1 | 9/2007 | Tawde |
| 2021/0012215 A1* | 1/2021 | Fei ..................... G06F 40/30 |
| 2021/0116555 A1 | 4/2021 | Zaccá |
| 2021/0182935 A1* | 6/2021 | Malkiel ............... G06F 16/3347 |
| 2021/0297979 A1* | 9/2021 | Hmimy ................ H04W 12/06 |
| 2021/0397845 A1* | 12/2021 | Ijaz ..................... G06F 40/30 |
| 2022/0050967 A1* | 2/2022 | Veyseh ................ G06F 40/289 |
| 2022/0121818 A1* | 4/2022 | Gopalakrishnan .... G06F 40/279 |
| 2022/0164600 A1* | 5/2022 | Cheng .................. G06N 3/045 |
| 2022/0253688 A1* | 8/2022 | Wu ..................... G06F 16/9535 |
| 2023/0161964 A1* | 5/2023 | Shah .................... G06F 40/279 |
| | | 704/9 |
| 2023/0394827 A1* | 12/2023 | Tao ..................... G06V 20/46 |
| 2024/0005099 A1* | 1/2024 | Dourban ............... G06F 40/279 |

OTHER PUBLICATIONS

Bharitkar, S., "Generative feature models and robustness analysis for Multimedia Classification," Proc. 18th IEEE Conf. on Machine Learning and Applications (IEEE-ICMLA), Dec. 16, 2019, pp. 105-110, United States.

* cited by examiner

| Classif. | Feat. | Acc. % | Decision (sec.) |
|---|---|---|---|
| Recordings | Cepstral coeffs. | ≈ 80 | 2 |
| speech/music | ZCR+energy | ≈ 90 | 2 |
| speech/music | short+long-term | ≈ 90 | 1-5 |
| speech/music | LSF+ZCR | ≈ 90 | 1-5 |
| music genre | temporal+spectral | ≈ 80 | 5 |

90

Result: Best model for GloVe($d^*_{seq\text{-}length}$)-LSTM($M^*_{GloVe}$) and BoW-LSA($d^*_{latent}$)-LSTM($M^*_{LSA}$) having highest accuracy and F1 score over all 10-partitions of the test set $TS(p)$ 1 Initialize: partition-count: $p = 1, 2, ..., 10$, GloVE emb. dim. 50 (6B tokens) or 300 (840B tokens), bayesopt-based Algorithm 2 run parameters: Max. of # Epochs = 800 and Duration = 5 hrs. for each $p \in \{1, ..., 10\}$;
2 While $p \leq 10$ do
3  Randomize training set $TR(p)$, validation set $VS(p)$, test set $TS(p)$;
4  Run Bayesian optimization (Algorithm 2) for $TR(p)$, $VS(p)$;
5  Compute accuracy$_{model}$ $(TS(p))$;
6  Compute F1score$_{model}$ $(TS(p))$;
7 end
8 meanaccuracy$_{model}$ $(TS) = \Sigma_{p=1}^{10}$ accuracy$_{model}$ $(TS(p))$;

9 Initialize bayesopt search limits $d_{seq\text{-}length} \in \{2, 30\}$, $d_{latent} \in \{5, 500\}$, $M \in \{10, 600\}$ ($M$ defined in (1)), LSTM($M$) parameters: ADAM optimizer, $\eta_0 = 0.1$, $\eta_{drop\text{-}factor} = 0.99$, $\eta_{drop\text{-}period} = 5$;
10 if BoW then
11  Create bag-of-words for $TR(p)$;
12  LSA($d_{latent}$) using singular value decomposition on bag-of-words;
13  Train LSTM($M$);
14  Generate $VS_{out}(p)$ on $VS(P)$ with model LSA($d_{latent}$)-LSTM($M$); $VS_{out}(p) = \{\hat{e}_c\}$ is the set of unit vectors for the validation set $VS(p)$, each of dimension seventeen with zeros except at the $c$-th class position classified by LSTM($M$) $c = \{1, ..., 17\}$;
15 end
16 if GloVe then
17  Generate output GloVe($d^{seq\text{-}length}$);
18  Train LSTM($M$);
19  Generate $VS_{out}(p)$ on $VS(p)$ with GloVe($d_{seq\text{-}length}$)-LSTM($M$); $VS_{out}(p) = \{\hat{e}_c\}$ is the set of unit vectors for the validation set $VS(p)$, each of dimension 17 with zeros except at the $c$-th class position $c = \{1, ..., 17\}$;
20 end
21 Use bayesopt to minimize $ErrVS(p) = 1/|VS(p)|(\Sigma_{r=1}^{|VS(p)|} \mathbb{I}[VS_{out}(r) - VS_{true}(r)])$, where $\mathbb{I}$ is the indicator function, |.| is the cardinality of the validation set, $VS_{true}(r)$ is the true class for the $r$-th datapoint in the validation set;

FIG. 10

DEEP LEARNING FOR MULTIMEDIA CLASSIFICATION

CROSS-REFERENCE TO RELATED APPLICATIONS

This application claims the priority benefit of U.S. Provisional Patent Application Ser. No. 63/412,844, filed on Oct. 3, 2022, which is incorporated herein by reference in its entirety.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to multimedia classification, and in particular, to improving accuracy for classification of the media content item using a trainable model.

BACKGROUND

The automatic classification of content is an essential requirement for streaming multimedia applications in order to perform appropriate post-processing and rendering on consumer devices (televisions (TVs), soundbars, smartphones, etc.). For audio, the processing ranges from spatial processing (e.g., up-mixing, Head Related Transfer Function (HRTF) processing, etc.) and surround/immersive enhancement for movies/documentaries/sports-classes, reverberation synthesis, dialog enhancement for news/ads/sports/education-classes; whereas, for video-centric classes the applications range from dynamic range enhancement for certain sports, and efficient object tracking (players, soccerball, etc.), etc. Classical approaches for streaming media classifiers rely on audio-analysis with time-frequency features or video motion-based classifiers. An alternative approach to classifying streaming content into one of three-classes (Movie, Music, Other) leverage numeric metadata features based on fixed class-conditional distributions.

Large Language Models (LLMs) have become popular for text-based interaction. Pretrained architectures employing LLMs can be fine-tuned for a variety of tasks, including prediction and classification, using transfer learning. However, these models are compute-intensive, have large memory requirements, and have high inference latency which can preclude the deployment of such models for real-time applications.

SUMMARY

One embodiment provides a computer-implemented method that includes utilizing text information obtained from a title of a media content item and a trainable model for improving accuracy for classification of the media content item. The trainable model is utilized using a sequence of text to numeric-vector embeddings for classification of the media content item. At least one of a word embedding model parameter or a latent semantic analysis dimension is jointly optimized using the text information, and a classifier model for maximizing accuracy of the classification of the media content item.

Another embodiment includes a non-transitory processor-readable medium that includes a program that when executed by a processor performs improving accuracy for multimedia content classification, including utilizing, by the processor, text information obtained from a title of a media content item and a trainable model for improving accuracy for classification of the media content item. The processor further utilizes the trainable model using a sequence of text to numeric-vector embeddings for classification of the media content item. The processor additionally jointly optimizes at least one of a word embedding model parameter or a latent semantic analysis dimension, using the text information, and a classifier model for maximizing accuracy of the classification of the media content item.

Still another embodiment provides an apparatus that includes a memory storing instructions, and at least one processor executes the instructions including a process configured to utilize text information obtained from a title of a media content item and a trainable model for improving accuracy for classification of the media content item. The process further utilizes the trainable model using a sequence of text to numeric-vector embeddings for classification of the media content item. The process additionally jointly optimizes at least one of a word embedding model parameter or a latent semantic analysis dimension, using the text information, and a classifier model for maximizing accuracy of the classification of the media content item.

These and other features, aspects and advantages of the one or more embodiments will become understood with reference to the following description, appended claims and accompanying figures.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 9 illustrates a pseudo-code flow of a Bayesian optimization for conducting a model search, according to some embodiments;

FIG. 10 illustrates a pseudo-code flow of a Bayesian hyper-parameter optimization, according to some embodiments.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

A description of example embodiments is provided on the following pages. The text and figures are provided solely as examples to aid the reader in understanding the disclosed technology. They are not intended and are not to be construed as limiting the scope of this disclosed technology in any manner. Although certain embodiments and examples have been provided, it will be apparent to those skilled in the art based on the disclosures herein that changes in the embodiments and examples shown may be made without departing from the scope of this disclosed technology.

One or more embodiments relate generally to multimedia classification, and in particular, to improving accuracy for classification of the media content item using a trainable model. One embodiment provides a computer-implemented method that includes utilizing text information obtained from a title of a media content item and a trainable model for improving accuracy for classification of the media content item. The trainable model is utilized using a sequence of text to numeric-vector embeddings for classification of the media content item. At least one of a word embedding model parameter or a latent semantic analysis dimension is jointly optimized using the text information, and a classifier model for maximizing accuracy of the classification of the media content item.

Some embodiments provide multimedia classification for streaming audio in the context of enhancing the quality of experience for the consumer. One or more embodiments jointly optimize parameters associated with a word representation model and a classifier (e.g., a sequence classifier) to create a low-complexity model for real-time multimedia classification. Results of the low-complexity model outperform (in terms of accuracy, memory, latency, number of parameters, and carbon footprint) the results from the State-of-the-Art (SoTA) Transformer architecture used in LLMs. The disclosed technology leverages an optimizable text-representation model (viz., Global Vector Embedding or Latent Semantic Analysis) with a single hidden layer of long short-term memory (LSTM) cells, where LSTM is a recurrent neural network (RNN).

Figures 1, 2:
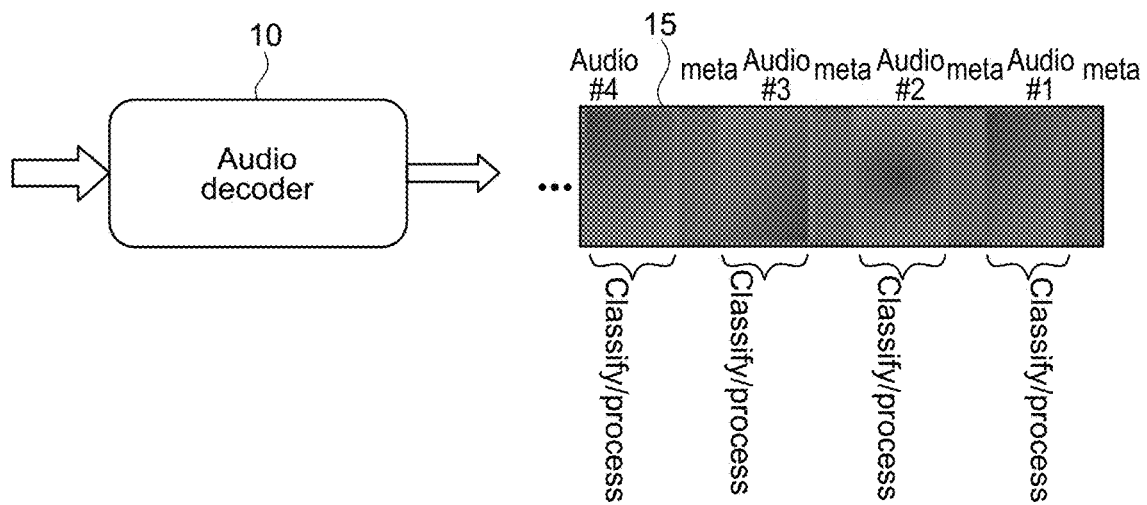
FIG. 1 illustrates an example of an audio based classification system.
FIG. 2 illustrates an example table of various classification approaches.

FIG. 1 illustrates an example of an audio based classification system. Presently many streaming services provide a platform for a rich mixture of content including movies (international and local), music (videos and non-video), documentaries, advertisements, news, etc. In particular, one streaming service has over 5 million subscribers and over 300 hours of video uploads per minute. An important reason to classify streaming content into different classes is to apply appropriate signal-processing-based filters (audio or video) as presets based on the class (e.g., to preserve artistic intent). For example, movies are created in 5.1 or object-based audio, whereas music is in stereo. A spatial renderer could introduce artifacts when it spatializes native 2.0 music to 5.1 channels.

Classifiers include feature extraction, machine-learning classifiers, or deep-learning approaches for end-to-end classification. For audio-based classification, the classifier operates on features using an inter- and intra-frame analysis to perform a 1-of-N class decision, as shown in FIG. 1, which includes an audio decoder 10 and classification processes 15. Waveform analysis techniques typically impose a latency of several seconds before a classification result is made available. Various audio waveform techniques for classification, in terms of latency and accuracy have been compared and contrasted. Additional techniques using audio or video frames analysis for classification do exist. A multi-modal classifier (audio, video, text), employing a 300-d Word2Vec embedding with a convolutional neural network (CNN)-based classifier, was used for an online dataset. A CNN is a deep learning algorithm/process that can take in an input image, assign importance (learnable weights and biases) to various aspects/objects in the image, and be able to differentiate one from the other. Using both title and description, a six-class Random Forest classifier and a bag-of-words model are available. There is also a 23-sports genre classifying technique using a bag-of-visual-words, based on video-frame analysis. Another example presents a transcription based on automatic speech recognition from videos for video genre classification (viz., 7-genre). The techniques mentioned above either leverage existing datasets, are not necessarily deployable for real-time streaming applications and are optimized primarily using audio or video frames.

FIG. 2 illustrates an example table 20 of various classification approaches. Table 20 includes the classification, features, accuracy and time to decision. Content metadata is part of the Motion Pictures Expert Group (MPEG) (jointly with the International Stands Organization) standards. An atom describing the content within a media file format (e.g., MPEG-Layer 4 or MP4) is a basic data unit that contains a header and a data field. The header comprises referencing metadata that describes the content (e.g., chapter index, Title, poster image data, optional text descriptors). The Title is explicitly present in the header since the Title enables the viewer to retrieve content based on preference or for the streaming service to display the Title and poster content in the menu window. A tool 80 (FIG. 8) may be used to parse the various metadata.

Figure 3:
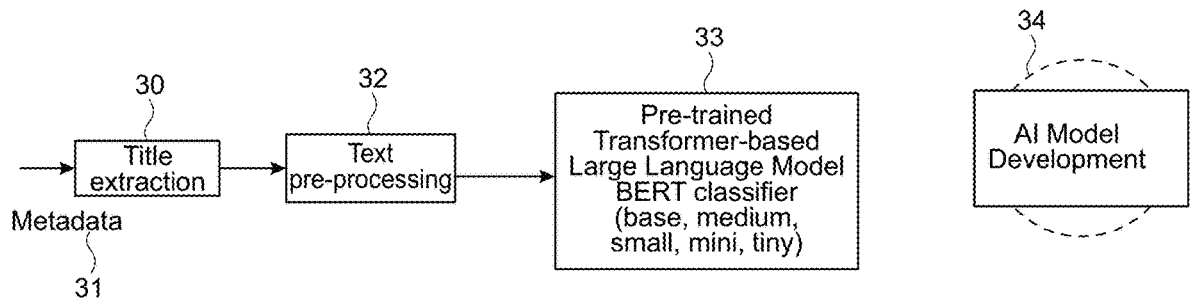
FIG. 3 illustrates a baseline architecture for multimedia classification with an addition of a trainable (e.g., artificial intelligence (AI)) model development process, according to some embodiments.

FIG. 3 illustrates a baseline architecture for multimedia classification with an addition of a trainable (e.g., artificial intelligence (AI)) model 34 development process, according to some embodiments. In some embodiments, a text pre-processing block 32 is initially applied to the Title metadata field, from metadata 31 after title extraction 30, to remove stop words, lowercase text, and punctuation, and generate tokens. The result is processed by block 33 that is a pre-trained transformer-based Large Language Model (LLM) classifier (e.g., Bidirectional Encoder Representations from Transformers (BERT)). In one or more embodiments, the text processing involves assessing several different approaches for word-vector mapping, such as Latent Semantic Analysis (LSA).

Figure 4:
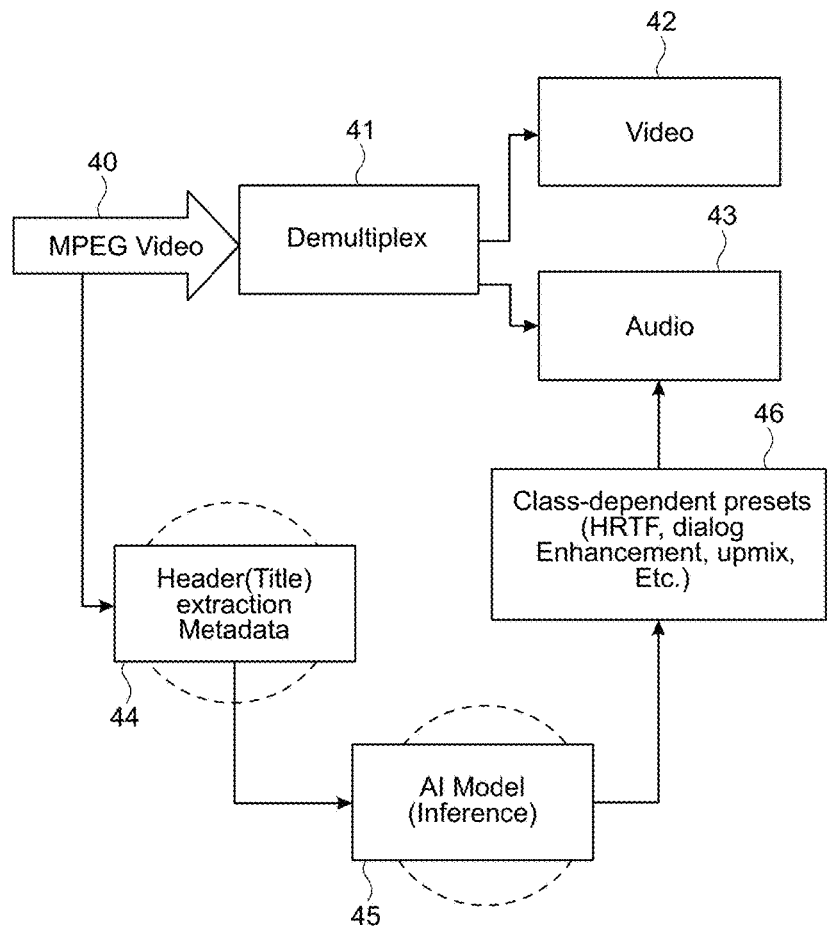
FIG. 4 illustrates an architecture of the disclosed technology with metadata extraction and an AI model, according to some embodiments.

FIG. 4 illustrates an architecture of the disclosed technology with metadata extraction (header (title) extraction metadata) 44 and an AI model 45, according to some embodiments. In one or more embodiments, the architecture includes input of MPEG video 40, which is demultiplexed with a demultiplex process 41 that demultiplexes video 42 and audio 43. The metadata extraction 44 extracts a title from the metadata of the input MPEG video 40. The extracted title is input into the AI model. The AI model results are utilized by the class-dependent presets (Head Related Transfer Function (HTRF), dialog enhancement upmix, etc.) process 46 where the results of classification are added to the audio 43 file/stream.

Figure 5:
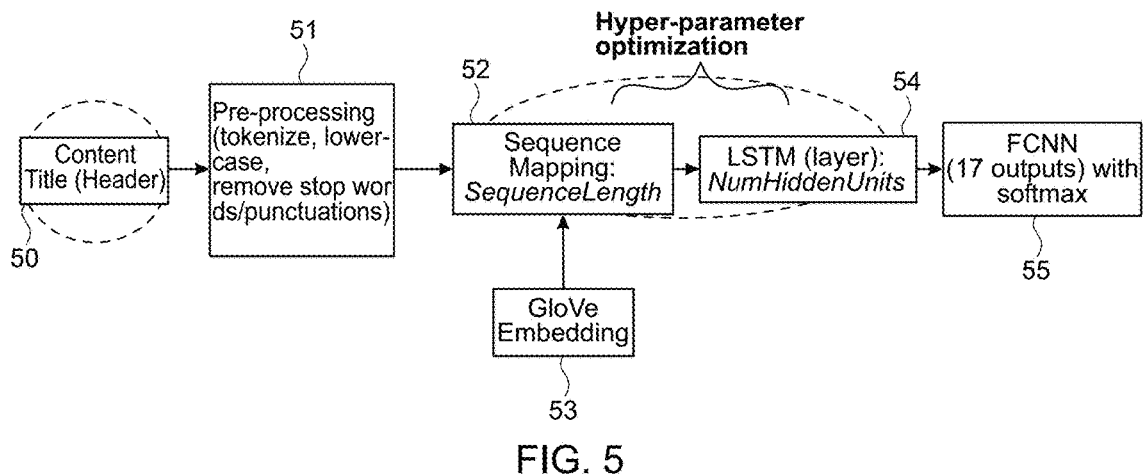
FIG. 5 illustrates another architecture of the disclosed technology with hyper-parameter optimization and an AI model, according to some embodiments.

FIG. 5 illustrates another architecture of the disclosed technology with hyper-parameter optimization and an AI model, according to some embodiments. In one or more embodiments, the architecture shown includes input of a media content title 50 (e.g., from the metadata header) to pre-processing block 51 (e.g., tokenize, lowercase, removes stop words/punctuations, etc.). The pre-preprocessed title is input to hyper-parameter optimization including sequence mapping 52 (sequence length) and an LSTM (layer) 54 (number of hidden units). GloVe (global log-bilinear regression model) embedding 53 output is input to the sequence mapping 52. The output from the LSTM 54 is input to fully connected neural network (FCNN) 55 (e.g., 17 outputs) with a softmax function (the softmax function is a function that turns a vector of K real values into a vector of K real values that sum to 1). The FCNN 55 is a feed forward neural network. The classification model (viz., the LSTM 54 with a 17-class fully connected neural network and softmax layer, or a support vector machine (SVM)) operates on the output from the word-vector mapping. An SVM is a type of supervised learning algorithm used in machine learning to solve classification and regression tasks. SVMs are known for good generalization performance and are used to compare with the LSTM 54.

In some embodiments, the LSTM 54 is utilized for sequence modeling where a self-state unit $s_i(t)$ with a linear dependency on the past value of the state unit via a scaling term $f_i(t)$ (viz., $l_i(t)=s_i(t-1)f_i(t)$) associated with a forget gate helped resolve vanishing gradient limitations. In pseudo-code 90 (FIG. 9), a single hidden layer and include M (the number of hidden units as a hyper-parameter in the Bayesian optimization. A single-layer fully connected neural network with 17-outputs and a softmax classification layer operates on the output of the LSTM(M) 54. In SVM, for a two-class classification problem, the support vectors are constrained to be on the margins on the sides of the hyperplane. Typically, a kernel transform initially maps the input dimension to a higher dimensional space. For a 17-class task, the hyper-parameters in the Bayesian optimization algorithm (pseudo-code 90) are the type of kernel function (Gaussian, linear, quadratic, or cubic). One-vs-One (OvO), or One-vs-All (OvA) classification (given this is not a binary classification task), and box-constraint parameters which correspond to the value of the Lagrange multipliers provide additional variables for optimization.

In one or more embodiments, fastText is a word embedding model from a social media/networking, where a unique model corresponds to each of the 294 languages. The core model, based on n-gram features, generates a 300-dimensional vector representation for a word giving rise to a three-dimensional (3-D) array of $5472 \times 300 \times d_{fastText}$, where $d_{fastText}$ is the length of the number of words selected to create the word to vector embedding. In the disclosed technology approach, $d_{fastText}$ is a search hyper-parameter used during Bayesian optimization, as shown in pseudo-code 90 (FIG. 9). Social media/networking provides a PYTHON® utility to reduce the word-vector dimension to a value less than 300. In an example embodiment, two extremes (viz., 300 and 50 dimensional) are used for the word vectors. The 50-d vector representation is also quantized to assess performance with a compact memory model.

In some embodiments, GloVe is a global log-bilinear regression model that combines the advantages of global matrix factorization and local context window analysis. Embeddings produced by GloVe outperform those produced by word2vec in several natural language processing (NLP) tasks, especially when the text corpus is small or where insufficient data is available to capture local context dependencies. In one or more embodiments, the base representation used is a 300-d vector trained with Common Crawl open source web crawl corpus (840 B tokens, 2.2M vocabulary). Similarly for GloVe, the optimization is done $5472 \times 300 \times d_{GloVe}$ where $d_{GloVe}$ is the length of the number of words selected to create the word to vector embedding.

In some embodiments, a Bayesian approach is a popular technique for optimizing objective functions that require a significant amount of computational resources to evaluate. The architecture builds a surrogate function of the accuracy and quantifies the uncertainty in that surrogate using a Bayesian machine learning technique, Gaussian process regression, and then uses an acquisition function defined from this surrogate to decide where to sample in the hyper-parameter space. In this optimization, the disclosed technology can set up several hyperparameters: (i) embedding dimension for either the GloVe, fastText, or LSA; (ii) number of hidden units for a single-layer LSTM, kernel function, OvO or OvA, and box constraints for the SVM for the 17-class classification. Alternative techniques for hyper-parameter optimization include Simulated Annealing, Particle Swarm Optimization, or constrained optimization techniques using heuristics.

Figure 6:
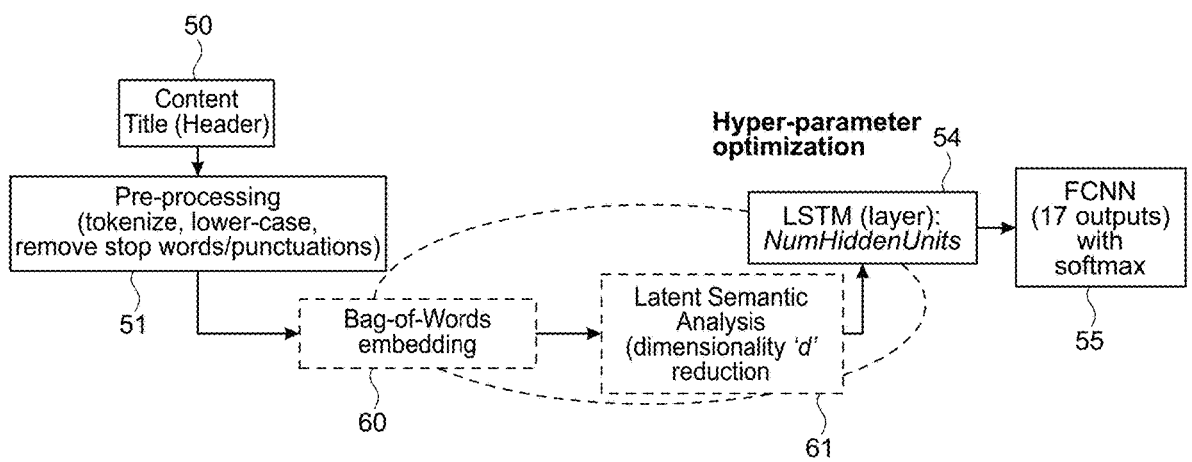
FIG. 6 illustrates yet another architecture of the disclosed technology with hyper-parameter optimization and an AI model, according to some embodiments.

FIG. 6 illustrates yet another architecture of the disclosed technology with hyper-parameter optimization and an AI model, according to some embodiments. In one or more embodiments, the architecture shown includes input of a media content title 50 (e.g., from the metadata header) to pre-processing block 51 (e.g., tokenize, lowercase, removes stop words/punctuations, etc.). The pre-preprocessed title is input to hyper-parameter optimization including bag-of-words model (embedding) 60, LSA 61 (dimensionality "d" reduction) and an LSTM (layer) 54 (number of hidden units). The output from the LSTM 54 is input to FCNN 55 (e.g., 17 outputs) with a softmax function.

In one or more embodiments, after tokenization, in some embodiments, the bag-of-words model 60 (which counts the number of terms in the training dataset) is constructed. The matrix of the bag-of-words representation is $\mathbb{R}^{5472 \times 10204}$ where 5472 includes 60% of the training set and 20% of the validation set (the validation set for error minimization during Bayesian optimization), and 10204 corresponds to the total number of words in the dataset. A singular value decomposition (SVD) machine learning technique reduces dimensionality by mapping the training data into two lower-rank matrices $W_1 \in \mathbb{R}^{5472 \times d_{latent}}$ and $W_2 \in \mathbb{R}^{d_{latent} \times 10204}$, where $d_{latent}$ represents the number of dominant singular values. In some embodiments, $d_{latent}$ is a search hyper-parameter used during Bayesian optimization, as shown in pseudo-code (or Algorithm) 90 (FIG. 9).

Figure 7:
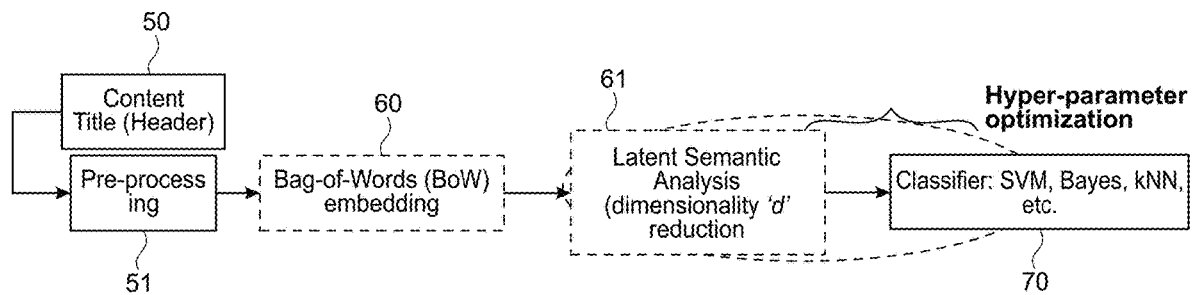
FIG. 7 illustrates still another architecture of the disclosed technology with hyper-parameter optimization, according to some embodiments.

FIG. 7 illustrates still another architecture of the disclosed technology with hyper-parameter optimization, according to some embodiments. In one or more embodiments, the architecture shown includes input of a media content title 50 (e.g., from the metadata header) to pre-processing block 51 (e.g., tokenize, lowercase, removes stop words/punctuations, etc.). The pre-preprocessed title is input to a bag-of-words model (embedding) 60. The output from the bag-of-words model 60 is input to hyper-parameter optimization including the latent semantic analysis 61 (dimensionality "d" reduction) and a classifier 70 (e.g., SVM, Bayes, KNN, etc.).

Figure 8:
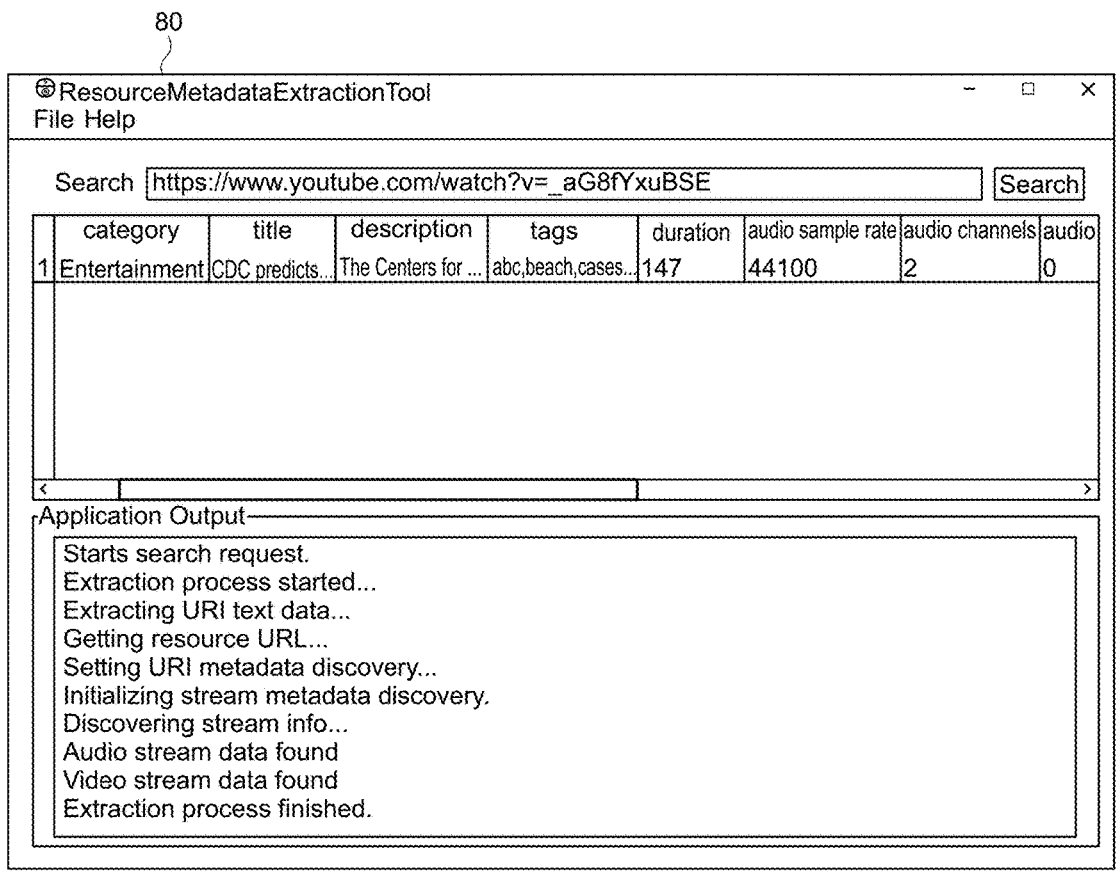
FIG. 8 illustrates an example of a metadata extraction tool that may be utilized for training data collection, according to some embodiments.

FIG. 8 illustrates an example of a metadata extraction tool 80 that may be utilized for training data collection, according to some embodiments. The metadata extraction tool may be utilized to parse title metadata after an initial visual inspection of diverse content to determine a balanced class distribution for annotation. In one example, a balanced dataset of ≈7000 content, corresponding to 17-classes (comprising the title and the annotated output class), may be generated. Statistics of the number of words in the title (viz., title sequence length $d_{seq-length}$) for the dataset. The parameter $d_{seq-length}$ is assigned as a hyper-parameter, given its wide range, in the GloVe and fastText-based approaches.

FIG. 9 illustrates a pseudo-code 90 flow of a Bayesian optimization for conducting a model search, according to some embodiments. Pseudo-code 90 shows the model-optimization algorithm. For each embedding, statistics of the mean accuracy can also be generated. FIG. 10 illustrates a pseudo-code 100 flow of a Bayesian hyper-parameter optimization, according to some embodiments. In some example embodiments, the disclosed technology may use GloVe and fastText with the LSTM model, whereas the LSA model cascades with an LSTM or an SVM. Either GloVe or Bag-of-Words (BoW) based embodiments can be used based on memory and latency on-device constraints for a target accuracy. Pseudo-codes 90 and 100 select the best model (GloVe or BoW-LSA based) by jointly optimizing the hyper-parameters (neural network model complexity and word embedding model dimension) using only a title for low memory, low latency and high-accuracy for on-device use-case.

Figure 11:
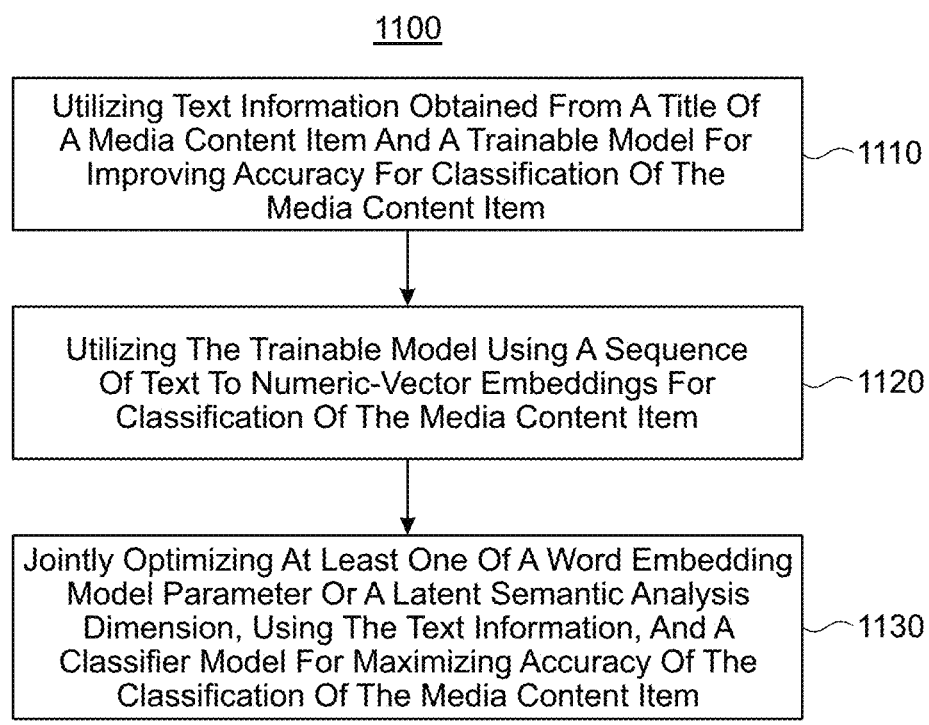
FIG. 11 illustrates a process for improving accuracy for classification of a media content item using a trainable model, according to some embodiments.

FIG. 11 illustrates a process 1100 for improving accuracy for classification of a media content item using a trainable model, according to some embodiments. In block 1110, process 1100 utilizes text information obtained from a title of a media content item and a trainable model (e.g., an AI model 34, FIG. 3, AI model 45, FIG. 4, FCNN 55, FIGS. 5-6, etc.) for improving accuracy for classification of the media content item (e.g., a multimedia content, etc.). In block 1120, process 1100 utilizes the trainable model using a sequence of text to numeric-vector embeddings for classification of the media content item. In block 1130, process 1100 jointly optimizes at least one of a word embedding model (e.g., GloVe embedding 53, FIG. 5, bag-of-words embedding 60, FIGS. 6-7, etc.) parameter or a LSA dimension, using the text information, and a classifier model (e.g., LSTM 54, FIGS. 5-6, classifier 70, etc.) for maximizing accuracy of the classification of the media content item.

In some embodiments, process 1100 further provides that the text information is the length of the title.

In one or more embodiments, process 1100 further provides that the text information is a bag-of-words representation.

In one or more embodiments, process 1100 further provides that the bag-of-words is a matrix that is converted to an LSA matrix.

In some embodiments, process 1100 additionally provides that jointly optimizing minimizes at least one of latency, complexity, carbon footprint, memory, or parameter quantity.

In one or more embodiments, process 1100 further provides that the trainable model is an LSTM neural network model.

In some embodiments, process 1100 further includes the feature that text length of the text information and a quantity of hidden units are utilized for performing hyper-parameter optimization for improving the accuracy for the classification of the media content item.

In one or more embodiments, process 1100 additionally includes the feature that the title of a media content item is processed from linguistic metadata.

In some embodiments, process 1100 further includes the feature that the metadata is included in a header of streaming media, and that the metadata is utilized for classifying the multimedia content before playback start of the multimedia content.

In one or more embodiments, process 1100 also includes controlling audio or video post-processing using the classifier model operating on the streaming media. Additionally, the joint optimization of the word embedding model includes performing a dimensionality reduction model (e.g., LSA 61, FIGS. 6-7) for the word embedding model in conjunction with a quantity of hidden units in the classifier model.

The present technology may be used to perform fast and reliably accurate real-time streaming media classification for TVs, mobile devices (e.g., smartphones, tablets, laptops, etc.) and/or other computing devices (e.g., wearable smart devices, AR/VR devices, head-mounted displays, desktop computers, etc.) to give the best possible content-adaptive audio and video experience to the consumer. In some embodiments, the classes are shown to be 17, and the approach may be readily adapted to leverage text metadata (e.g., title of content) to classify content. Additionally, one or more embodiments may be coupled with waveform based classifiers to further improve performance (hybrid-approach). In one or more embodiments, additional metadata (numeric or text) may be coupled with the title metadata to improve results. In some embodiments, the disclosed technology may be readily adapted to work on local devices (TV, soundbars, cell phones, etc.). For cloud environments, one or more embodiments may be deployed to mixed-media streaming servers.

In one or more embodiment, instead of residing on a system on a chip (SoC) or a digital signal processor (DSP) in a client device, the disclosed technology may reside in the cloud. The cloud approach may simply employ the AI inference model (AI model 45, FIG. 4) deployed on the cloud server, perform inference, and inject type of class identifier (e.g., one number between 0 and 18 identifying class) into the content before broadcast. On the device side, appropriate audio or video processing may be applied by first simply parsing the class identifier from the header.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A computer-implemented method comprising:
   utilizing text information obtained from a title of a media content item and a trainable model for improving accuracy for classification of the media content item;
   utilizing the trainable model using a sequence of text to numeric-vector embeddings for classification of the media content item; and
   jointly optimizing at least one of a word embedding model parameter or a latent semantic analysis dimension, using the text information, and a classifier model for maximizing accuracy of the classification of the media content item.

2. The method of claim 1, wherein the text information is the length of the title.

3. The method of claim 1, wherein the text information is a bag-of-words representation.

4. The method of claim 3 wherein the bag-of-words is a matrix that is converted to a latent semantic analysis matrix.

5. The method of claim 1, wherein jointly optimizing minimizes at least one of latency, complexity, carbon footprint, memory, or parameter quantity.

6. The method of claim 1, wherein the trainable model is a long short-term memory (LSTM) neural network model.

7. The method of claim 1, wherein text length of the text information and a quantity of hidden units are utilized for performing hyper-parameter optimization for improving the accuracy for the classification of the media content item.

8. The method of claim 1, wherein the title of the media content item is processed from linguistic metadata.

9. The method of claim 8, wherein the metadata is included in a header of streaming media, and the metadata is utilized for classifying the multimedia content before playback start of the multimedia content.

10. The method of claim 9, further comprising:
    controlling audio or video post-processing using the classifier model operating on the streaming media;
    wherein joint optimization of the word embedding model includes performing a dimensionality reduction model for the word embedding model in conjunction with a quantity of hidden units in the classifier model.

11. A non-transitory processor-readable medium that includes a program that when executed by a processor performs improving accuracy for multimedia content classification, comprising:
    utilizing, by the processor, text information obtained from a title of a media content item and a trainable model for improving accuracy for classification of the media content item;
    utilizing, by the processor, the trainable model using a sequence of text to numeric-vector embeddings for classification of the media content item; and
    jointly optimizing, by the processor, at least one of a word embedding model parameter or a latent semantic analysis dimension, using the text information, and a classifier model for maximizing accuracy of the classification of the media content item.

12. The non-transitory processor-readable medium of claim 11, wherein the text information is the length of the title.

13. The non-transitory processor-readable medium of claim 11, wherein the text information is a bag-of-words representation, and the bag-of-words is a matrix that is converted to a latent semantic analysis matrix.

14. The non-transitory processor-readable medium of claim 11, wherein:
    jointly optimizing minimizes at least one of latency, complexity, carbon footprint, memory, or parameter quantity;
    the trainable model is a long short-term memory (LSTM) neural network model; and
    text length of the text information and a quantity of hidden units are utilized for performing hyper-parameter optimization for improving the accuracy for the classification of the media content item.

15. The non-transitory processor-readable medium of claim 11, wherein:
    the title of the media content item is processed from linguistic metadata;
    the metadata is included in a header of streaming media; and
    the metadata is utilized for classifying the multimedia content before playback start of the multimedia content.

16. The method of claim 15, further comprising:
    controlling audio or video post-processing using the classifier model operating on the streaming media;
    wherein joint optimization of the word embedding model includes performing a dimensionality reduction model for the word embedding model in conjunction with a quantity of hidden units in the classifier model.

17. An apparatus comprising:
    a memory storing instructions; and
    at least one processor executes the instructions including a process configured to:
    utilize text information obtained from a title of a media content item and a trainable model for improving accuracy for classification of the media content item;
    utilize the trainable model using a sequence of text to numeric-vector embeddings for classification of the media content item; and
    jointly optimize at least one of a word embedding model parameter or a latent semantic analysis dimension, using the text information, and a classifier model for maximizing accuracy of the classification of the media content item.

18. The apparatus of claim 17, wherein:
the text information is the length of the title or a bag-of-words representation; and
the bag-of-words is a matrix that is converted to a latent semantic analysis matrix.

19. The apparatus of claim 17, wherein:
jointly optimizing minimizes at least one of latency, complexity, carbon footprint, memory, or parameter quantity;
the trainable model is a long short-term memory (LSTM) neural network model;
text length of the text information and a quantity of hidden units are utilized for performing hyper-parameter optimization for improving the accuracy for the classification of the media content item;
the title of the media content item is processed from linguistic metadata;
the metadata is included in a header of streaming media; and
the metadata is utilized for classifying the multimedia content before playback start of the multimedia content.

20. The apparatus of claim 19, wherein the process is further configured to:
control audio or video post-processing using the classifier model operating on the streaming media;
wherein joint optimization of the word embedding model includes performing a dimensionality reduction model for the word embedding model in conjunction with a quantity of hidden units in the classifier model.

* * * * *